US009436421B2

United States Patent
Abello Rosello et al.

(10) Patent No.: US 9,436,421 B2
(45) Date of Patent: Sep. 6, 2016

(54) DATA FLOW TO A PRINTING DEVICE

(71) Applicant: HEWLETT-PACKARD DEVELOPMENT COMPANY, L.P., Houston, TX (US)

(72) Inventors: Lluis Abello Rosello, Tarragona (ES); Kevin G. Currans, Philomath, OR (US); Jon Derek Roller, Corvallis, OR (US); Jose M. Galmes, San Diego, CA (US); Cesar Fernandez Espasa, San Diego, CA (US); John A. Bertani, Corvallis, OR (US); Matthew Alan MacClary, Corvallis, OR (US); Santiago Garcia-Reyero Vinas, San Diego, CA (US); Daniel Edgar Robin, Corvallis, OR (US); Steven Eric Sneller, Corvallis, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/092,514

(22) Filed: Apr. 6, 2016

(65) Prior Publication Data

US 2016/0224296 A1 Aug. 4, 2016

Related U.S. Application Data

(63) Continuation of application No. 14/123,721, filed as application No. PCT/US2011/039598 on Jun. 8, 2011, now Pat. No. 9,329,826.

(51) Int. Cl.
*G06F 3/12* (2006.01)
*G06K 15/02* (2006.01)
*G06K 15/10* (2006.01)

(52) U.S. Cl.
CPC ............ *G06F 3/1275* (2013.01); *G06F 3/124* (2013.01); *G06F 3/1214* (2013.01);
(Continued)

(58) Field of Classification Search
CPC .. G06F 3/1293; G06F 3/1214; G06F 3/1247; G06F 3/1285; G06F 3/124; G06F 3/1275; G06K 15/102; G06K 15/1801; G06K 15/1814; G06K 15/1853; G06K 15/1857; G06K 15/1859; G06K 15/1836; G06K 15/1856; G06K 15/1873; G06K 15/1878
See application file for complete search history.

(56) References Cited

U.S. PATENT DOCUMENTS 5,239,625 A   8/1993  Bogart et al.
7,301,669 B1  11/2007 Yamada et al.
(Continued)

FOREIGN PATENT DOCUMENTS

CN    1405004      3/2003
JP    2007237527   9/2007
(Continued)

*Primary Examiner* — Quang N Vo
(74) *Attorney, Agent, or Firm* — Fabian Van Cott

(57) ABSTRACT

A method of increasing data flow to a printing device includes, with a first raster image processor, converting a document into a first bitmap having a first dot density and representing a black color plane of the document; with a second raster image processor, converting the document into a second bitmap at a second dot density that is a relatively lower dot density than that of the first bitmap, the second bitmap representing other color planes of the document; and transmitting data of the first and second bitmaps to a printing device for printing to a print medium.

18 Claims, 3 Drawing Sheets

(52) U.S. Cl.
CPC ......... *G06F 3/1293* (2013.01); *G06K 15/102* (2013.01); *G06K 15/1836* (2013.01); *G06K 15/1856* (2013.01); *G06K 15/1873* (2013.01); *G06K 15/1878* (2013.01)

(56) References Cited

U.S. PATENT DOCUMENTS

| | | |
|---|---|---|
| 2004/0056916 A1 | 3/2004 | Arquilevich |
| 2007/0081172 A1 | 4/2007 | Mantell |
| 2009/0002739 A1 | 1/2009 | Lapstun et al. |
| 2009/0141994 A1 | 6/2009 | Stevens |
| 2009/0284771 A1 | 11/2009 | Yamazaki |
| 2010/0045719 A1* | 2/2010 | Akama ................ B41J 2/2103 347/12 |
| 2010/0207987 A1 | 8/2010 | Sano |
| 2010/0289844 A1 | 11/2010 | Seibt |
| 2011/0012947 A1* | 1/2011 | Matsuhira .......... H04N 1/40031 347/9 |

FOREIGN PATENT DOCUMENTS

| | | |
|---|---|---|
| KR | 10-0334090 B1 | 6/2002 |
| WO | WO-2009106016 A1 | 9/2009 |

* cited by examiner

DATA FLOW TO A PRINTING DEVICE

BACKGROUND

Despite movement to a paperless society in which the use of paper is eliminated or greatly reduced, printed materials are still produced for various purposes. In printing, a raster image processor (RIP) is used to produce a raster image (i.e. a bitmap) of a page description in a high-level page description language. The bitmap is then sent to a printing device that, in turn, instructs a number of printheads to print the image on a print medium such as paper.

Oftentimes, however, the amount of data transferred to the printing device is so large, and the time it takes to produce a bitmap of the page description is so long, that it causes the printing device to be operated below the printer's maximum speed (e.g. in feet per minute) or starves the printing device of data altogether. For example, in commercial printing devices, once a printer or printer press starts work on a print job, hardware-ready data bits are to be made continuously available to the printer until the entire print job has completed printing. A printer or printing press starves and will be stopped or slowed when hardware-ready bits are not available. This causes the printing device to lose performance, and, in turn, causes profit for the print shop to decrease along with the decrease in production.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
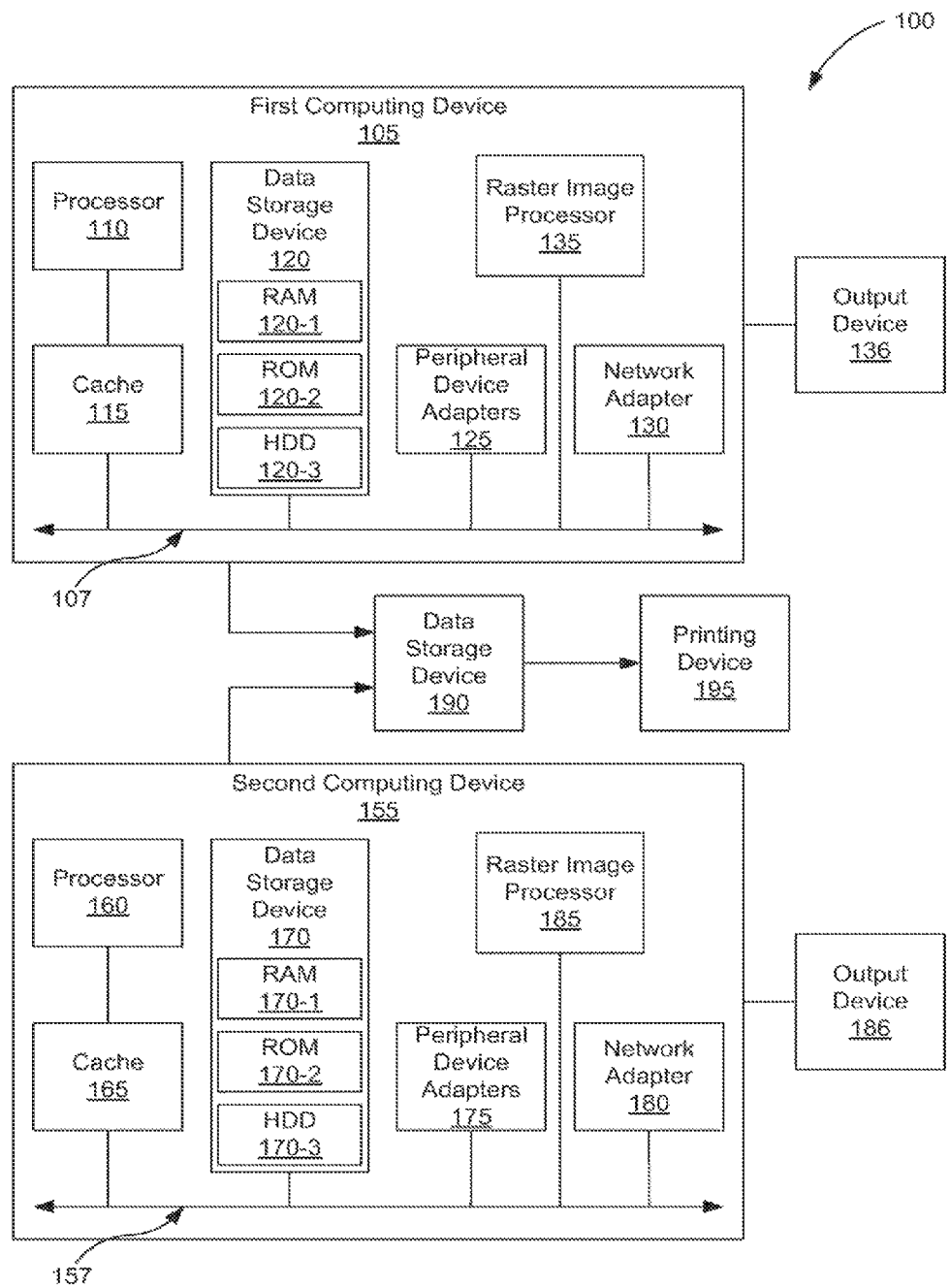
FIG. 1 is a diagram of an illustrative system for increasing data flow to a printing device, according to one example of the principles described herein.

The present specification discloses a system and method of decreasing the amount of data sent to a printing device. This eliminates the need to operate a printing device at a slower rate below its maximum capacity or shutting down the printing device to wait for data processing. The system comprises two raster image processors (RIPs) that simultaneously produce two bitmaps of a page. The first RIP produces a bitmap with a first number of dots per inch. The printing device will print cyan, magenta, and yellow color planes from this bitmap. The second RIP produces a bitmap with a second number of dots per inch that is a relatively larger amount of dots per inch than the first bitmap. The printing device will print the black color plane from this second bitmap.

In one example, the first bitmap defines a 300×300 dot per inch dot density and the second bitmap defines a 600×600 dot per inch dot density. In this manner, less data needs to be transmitted to the printing device. This, in turn, reduces or eliminates the need to operate the printing device at a slower rate below its optimal operating speed or starving of the printing device of data. In the specific example given, by converting the first bitmap at a 300×300 dot per inch dot density, the amount of data transmitted through the pipeline to the printing device is decreased by at least one quarter (¼) or more.

As used in the present specification and in the appended claims, the term "raster image," "bitmap," or similar language is meant to be understood broadly as a data structure representing a document in which each bit, or group of bits, represents or corresponds to pixels, or points of color, viewable via a monitor and/or printable on a printable medium. Accordingly, as used in the present specification and in the appended claims, the term "raster image processor," "RIP," or similar language is meant to be understood broadly as a hardware device or a combination of hardware and firmware or software that produces a raster image or bitmap of a document. An RIP converts a Page Description Language (PDL) description of a document into a bitmap for printing.

As used in the present specification and in the appended claims, the term "document," "page," "image," or similar language is meant to be understood broadly as any set of data that is converted by a RIP into a raster image or bitmap. A document may be, for example, a page description in a page description language (PDL) such as Adobe Systems' Adobe® PostScript® 3™ (or other versions), Adobe Systems' Adobe® Portable Document Format, or XML paper specification developed by Microsoft®, and Ecma International®. In one example, the present system and method determines each page from a PDF document to be a document. In this manner, a single PDF page is the document that is simultaneously converted by at least two RIPs at different resolutions.

Further, as used in the present specification and in the appended claims, the term "pipeline," or similar language is meant to be understood broadly as any number of hardware devices and associated firmware and software, including those that form wireless or optical data links, that are used to transmit and prepare converted bitmaps for printing at a printing device. In one example, the pipeline comprises compression processors, decompression processors, resolution conversion processors, driving signal transmission units, among others. Still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

FIG. 1 is a diagram of an illustrative system (100) for increasing data flow to a printing device (195), according to one example of the principles described herein. The system (100) comprises a first computing device (105), a second computing device (155), a data storage device (190), and a printing device (195). Each of these elements will now be discussed in more detail.

In the present example, for the purposes of simplicity in illustration, the first computing device (105), second computing device (155), data storage device (190), and printing device (195) are separate devices communicatively coupled to each other via communication paths. However, the principles set forth in the present specification extend equally to any alternative configuration in which a number of these elements are combined in a number of configurations. As such, alternative examples within the scope of the principles of the present specification include, but are not limited to, examples in which any number of the first computing device (105), second computing device (155), data storage device (190), and printing device (195) are implemented by the same device, examples in which the functionality of the first computing device (105), second computing device (155) are implemented by multiple interconnected computers, and examples in which a number of the first computing device (105), second computing device (155), data storage device (190), and printing device (195) communicate directly through a bus without intermediary network devices. In yet another example, the first computing device (105) and second computing device (155) may be embodied in the printing device (195).

The first computing device (105) of the present example retrieves data from a number of sources such as, for example, the data storage device (120) or cache (115), and generates a raster image that is then output to other devices such as, for example, the data storage device (190) or the printing device (195). In the present example, this is accomplished by the processor (110) obtaining a document from the data storage device (120) or cache (115), transmitting the document to the raster image processor (RIP) (135), after which the RIP (135) converts the document into a bitmap. In another example, the first computing device (105), and, specifically, the processor (110), obtains the document from an outside source over a network using the appropriate network protocol, for example, Internet Protocol ("IP"). Illustrative processes regarding generation and output of the raster image are set forth in more detail below.

To achieve its desired functionality, the first computing device (105) includes various hardware components. Among these hardware components may be the processor (110), the cache memory (115), the data storage device (120), peripheral device adapters (125), a network adapter (130), and the raster image processor (135). These hardware components may be interconnected through the use of a number of busses and/or network connections. In one example, the processor (110), cache memory (115), data storage device (120), peripheral device adapters (125), network adapter (130), and raster image processor (135) may be communicatively coupled via bus (107).

The processor (110) may include the hardware architecture for retrieving executable code from the data storage device (120) and executing the executable code. The executable code may, when executed by the processor (110), cause the processor (110) to implement at least the functionality of obtaining a document from the data storage device (120) or cache (115), and transmitting the document to the raster image processor (RIP) (135) according to the methods of the present specification described herein. In the course of executing code, the processor (110) may receive input from, and provide output to, a number of the remaining hardware units such as, for example, the raster image processor (135).

The processor (110), in one example, presents the user with a user interface on an output device (136) in order to interface with and receive instructions from a user of the present system (100). The output device (136) may be any number of devices that provide a representation of, for example, the document before and/or after it has been converted into a raster image. In one example, the output device (136) is a display device such as a cathode ray tube, a plasma display, a laser imaging controller, or a liquid crystal display, among others.

The data storage device (120) may store data that is processed and produced by the processor (110). As discussed above and in more detail below, the data storage device (120) may also specifically save data including, for example, documents. All of this data may further be stored in the form of a sorted database for easy retrieval. The data storage device (120) may include various types of memory modules, including volatile and nonvolatile memory. For example, the data storage device (120) of the present example includes random access memory (RAM) (120-1), read only memory (ROM) (120-2), and a hard disk drive (HDD) memory (120-3). Many other types of memory may be employed, and the present specification contemplates the use of many varying type(s) of memory in the data storage device (120) as may suit a particular application of the principles described herein. In certain examples, different types of memory in the data storage device (120) may be used for different data storage needs. For example, in certain examples the processor (110) may boot from ROM (120-2), maintain nonvolatile storage in the HDD (120-3) memory, and execute program code stored in RAM (120-1).

Generally, the data storage device (120) may comprise a computer readable storage medium. For example, the data storage device (120) may be, but is not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, the processor (110). In another example, a computer readable storage medium may be any form of non-transitory medium.

The peripheral device adapters (125) and network adapter (130) in the first computing device (105) enable the processor (110) to interface with various other hardware elements, external and internal to the first computing device (105). For example, peripheral device adapters (125) may provide an interface to input/output devices, such as, for example, output device (136), to create a user interface. As noted herein, an output device (136) may be provided to allow a user to interact with the first computing device (105) in order to obtain a document from the data storage device (120) or cache (115) and transmit the document to the raster image processor (RIP) (135) for further processing. Peripheral device adapters (125) may also create an interface between the processor (110) and the data storage device (190) or printer (195). For example, where the first computing device (105) obtains a document from the data storage device (120) or cache (115), transmits the document to the raster image processor (RIP) (135), the RIP (135) converts the document into a bitmap, and the user then wishes to print the rasterized image, the first computing device (105) may instruct the printer (195) to create a number of physical copies of the rasterized image.

A network adapter (130) may additionally provide an interface to a network, thereby enabling the transmission of data or records to, and receipt of, the data or records from other devices on the network, including documents. In one example, the network may comprise two or more computing devices communicatively coupled. For example, the network may include a local area network (LAN), a wide area network (WAN), a virtual private network (VPN), and the Internet, among others.

The raster image processor (RIP) (135) obtains the document, and converts the document into a bitmap. This bitmap is then passed to the printing device (195), and, more specifically, a print engine of the printing device (195), which converts the bitmap into electrical signals to drive the physical mechanisms of the printing device (195) such as, for example, the nozzles of a printhead within the printing device (195). In one example, the RIP (135) exists within the first computing device (105) and functions as a processor in addition to the processor (110). In another example, the first computing device (105) may comprise the RIP (135) without the processor (110). In this example, the RIP (135) obtains the document from the data storage device (120) or cache (115) directly and converts the document into a bitmap. In yet another example, the RIP (135) is implemented within the printing device (195) and obtains the document from a source such as the data storage device (120) or cache (115), and converts the document into a bitmap.

In the present specification, the raster image processor (RIP) (135) of the first computing device (105) converts the document into a bitmap at a dot density of 300×300 dots per inch. The first computing device represents the cyan, magenta, and yellow (CMY) color planes in the 300×300 dots per inch bitmap. The first computing device then sends the CMY data to the printing device (195) at the same time as the data for the black color plane is sent, as will be discussed in more detail below. By converting the document to a bitmap at a relatively lower resolution, the amount of data that travels through the pipeline to the printing device (195) is reduced. In this manner, data flow is increased to the printing device (195) because less data is sent, and the printing device (195) is not starved for want of data. In one example, the RIP (135) utilizes a version of Global Graphic's® Harlequin® RIP; for example, version 8.2.

When the printing device (195) receives the 300×300 dots per inch CMY bitmap data for printing, the printing device (195) is instructed to deposit additional ink through its nozzles to compensate for the relatively lower dot density with respect to the dot density for the black color plane, as will be discussed in more detail below. In one example, the additional ink deposited for the 300×300 dots per inch CMY bitmap data is in the form of larger drops fired from the nozzles. In another example, the additional ink deposited for the 300×300 dots per inch CMY bitmap data is in the form of more droplets fired from the nozzles. In this example, if the 300×300 dots per inch CMY bitmap data is half the dot density relative to the black color plane data, then the nozzles are instructed to deposit twice as many dots of ink onto the print medium. Thus, in this example, any number of additional dots of ink may be deposited on the print medium to compensate for the relatively lower dot density with respect to the dot density for the black color plane.

Turning again to FIG. 1, the second computing device (155) will now be described in more detail. The second computing (155) of the present example retrieves data from a number of sources such as, for example, the data storage device (170) or cache (165), and generates a raster image that is then output to other devices such as, for example, the data storage device (190) or the printing device (195). In the present example, this is accomplished by the processor (160) obtaining a document from the data storage device (170) or cache (165) and transmitting the document to the raster image processor (RIP) (185), after which the RIP (185) converts the document into a bitmap. In another example, the second computing device (155), and, specifically, the processor (160) obtains the document from an outside source over a network using the appropriate network protocol, for example, Internet Protocol ("IP"). Illustrative processes regarding generation and output of the raster image are set forth in more detail below.

To achieve its desired functionality, the second computing device (155) includes various hardware components. Among these hardware components may be the processor (160), the cache memory (165), the data storage device (170), peripheral device adapters (175), a network adapter (180), and the raster image processor (185). These hardware components may be interconnected through the use of a number of busses and/or network connections. In one example, the processor (160), cache memory (165), data storage device (170), peripheral device adapters (175), network adapter (180), and raster image processor (185) may be communicatively coupled via bus (157).

The processor (160) may include the hardware architecture for retrieving executable code from the data storage device (170) and executing the executable code. The executable code may, when executed by the processor (160), cause the processor (160) to implement at least the functionality of obtaining a document from the data storage device (170) or cache (165), and transmitting the document to the raster image processor (RIP) (185) according to the methods of the present specification described herein. In the course of executing code, the processor (160) may receive input from, and provide output to, a number of the remaining hardware units such as, for example, the raster image processor (185).

The processor (160), in one example, presents the user with a user interface on an output device (186) in order to interface with and receive instructions from a user of the present system (100). The output device (186) may be any number of devices that provide a representation of, for example, the document before and/or after it has been converted into a raster image. In one example, the output device (186) is a display device such as a cathode ray tube, a plasma display, or a liquid crystal display, among others.

The data storage device (170) may store data that is processed and produced by the processor (160). As discussed above herein, the data storage device (170) may also specifically save data including, for example, documents. All of this data may further be stored in the form of a sorted database for easy retrieval. The data storage device (170) may include various types of memory modules, including volatile and nonvolatile memory. For example, the data storage device (170) of the present example includes random access memory (RAM) (170-1), read only memory (ROM) (170-2), and a hard disk drive (HDD) memory (170-3). Many other types of memory may be employed. The present specification contemplates the use of many varying type(s) of memory in the data storage device (170) as may suit a particular application of the principles described herein. In certain examples, different types of memory in the data storage device (170) may be used for different data storage needs. For example, in certain examples the processor (160)

may boot from ROM (170-2), maintain nonvolatile storage in the HDD (170-3) memory, and execute program code stored in RAM (170-1).

Generally, the data storage device (170) may comprise a computer readable storage medium. For example, the data storage device (170) may be, but is not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device such as, for example, the processor (160). In another example, a computer readable storage medium may be any form of non-transitory medium.

The peripheral device adapters (175) and network adapter (180) in the second computing device (155) enable the processor (160) to interface with various other hardware elements, external and internal to the second computing device (155). For example, peripheral device adapters (175) may provide an interface to input/output devices, such as, for example, output device (186), to create a user interface. As noted herein, an output device (186) may be provided to allow a user to interact with the second computing device (155) in order to obtain a document from the data storage device (170) or cache (165) and transmit the document to the raster image processor (RIP) (185) for further processing. Peripheral device adapters (175) may also create an interface between the processor (160) and the data storage device (190) or printer (195). For example, where the second computing device (155) obtains a document from the data storage device (170) or cache (165), transmits the document to the raster image processor (RIP) (185), and the RIP (185) converts the document into a bitmap, and the user then wishes to print the rasterized image, the second computing device (155) may instruct the printer (195) to create a number of physical copies of the rasterized image.

A network adapter (180) may additionally provide an interface to a network, thereby enabling the transmission of data or records to and receipt of the data or records from other devices on the network, including documents. In one example, the network may comprise two or more computing devices communicatively coupled. For example, the network may include a local area network (LAN), a wide area network (WAN), a virtual private network (VPN), and the Internet, among others.

The raster image processor (RIP) (185) obtains the document, and converts the document into a bitmap. This bitmap is then passed to the printing device (195), and, more specifically, a print engine of the printing device (195), which converts the bitmap into electrical signals to drive the physical mechanisms of the printing device (195) such as, for example, the nozzles of a printhead within the printing device (195). In one example, the RIP (185) exists within the second computing device (155) and functions as a processor in addition to the processor (160). In another example, the second computing device (155) may comprise the RIP (185) without the processor (160). In this example, the RIP (185) obtains the document from the data storage device (170) or cache (165) directly and converts the document into a bitmap. In yet another example, the RIP (185) is implemented within the printing device (195), obtains the document from a source such as the data storage device (170) or cache (165), and converts the document into a bitmap.

In the present specification, the raster image processor (RIP) (185) of the second computing device (155) converts the document into a bitmap at a dot density of 600×600 dots per inch. The second computing device obtains the black (K) color plane data from the 600×600 dots per inch bitmap, and sends the K data to the printing device (195). At the same time the CMY data is sent to the printing device (195) by the first computing device (105) as will be discussed in more detail below. By converting the document to a bitmap at a relatively higher resolution with regard to the RIP (135) of the first computing device (105), the higher dot per inch dot density of the K data (black dots on the printed medium) serve to retain clarity, sharpness, and contrast within the finished printed document. In this manner, the amount of data that travels through the pipeline to the printing device (195) is reduced due to the CMY color plane data provided at a relatively lower dot density, but the clarity, sharpness, and contrast of the finished printed document is maintained. In this manner, data flow is increased to the printing device (195) because less data is sent, the printing device (195) is not starved for want of data, and the finished printed document is not printed at a lower quality. In one example, the RIP (185) utilizes a version of Global Graphic's® Harlequin® RIP; for example, version 8.2.

When the printing device (195) receives the 600×600 dots per inch K bitmap data for printing, the printing device (195) is instructed to deposit ink through its nozzles at a relatively higher dot density with respect to the CMY data's dot density. In one example, the printing device (195) is instructed to deposit black ink through its nozzles at 600×600 dots per inch.

Turning again to FIG. 1, the data storage device (190) of the system (100) stores the bitmaps created by the RIP (135) of the first computing device (105) and the RIP (185) of the second computing device (155). Generally, the data storage device (190) may comprise a computer readable storage medium. For example, the data storage device (190) may be, but not limited to, an electronic, magnetic, optical, electromagnetic, infrared, or semiconductor system, apparatus, or device, or any suitable combination thereof. More specific examples of the computer readable storage medium may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing in any numbers. In the context of this document, a computer readable storage medium may be any tangible medium that can contain, or store a program for use by or in connection with an instruction execution system, apparatus, or device such as, for example, processor (110) or processor (160). In another example, a computer readable storage medium may be any form of non-transitory medium.

In one example, the data storage device (190) comprises 1 to n number of disk drives. In this example, the disk drives are redundant arrays of independent disks (RAID). By providing a number of RAIDs, more data, i.e. the bitmaps, can be written to the disk drives in preparation for printing, thus ensuring that the printing device (195) is not starved for want of data. In another example, the number of disk drives that make up the data storage device (190) is eleven. In this example, the eleven disk drives are RAIDs. A number of converted bitmaps are stored on each disk drive in preparation for transmission to the printing device (195). In one example, six bitmaps or fewer are stored on each disk drive.

The printing device (195) of FIG. 1 will now be described. The printing device may be any device that converts the bitmap data sent from the first computing device (105) and the second computing device (155) into instructions to a number of printheads and produces a copy of the document on physical print media. In one example, the printing device is a commercial printer. In this example, the printing device may be a printing device that utilizes Hewlett Packard's® Edgeline® printing technology. Hewlett Packard's® Edgeline® printing technology comprises an ink-based printing engine designed with printheads that span the width of a page. In Edgeline® printing technology, the paper moves, and not the printheads. The printheads are stationary printheads, arranged in a line, that dispense ink across the entire width of the print medium as the print medium passes beneath the printheads. This results in more accurate ink droplet placement, increased print speeds, crisp, print-shop quality output, a more reliable printing device with less maintenance and a lower total cost of operation.

The printing device (195) may be, for example, an ink-jet printing device, a dry electro-photography printing device, a liquid electro-photography printing device, a laser printing device, an LED printing device, a thermal ink-jet printing device, a piezoelectric ink-jet printing device, a toner-based printing device, or combinations thereof.

The print media used with the printing device (195) is any media on which a document may be printed such as, for example, paper, photographic paper, paperboard-cover stock, film, fabric, plastic, vinyl, carbon paper, or transparencies, among others.

Figure 2:
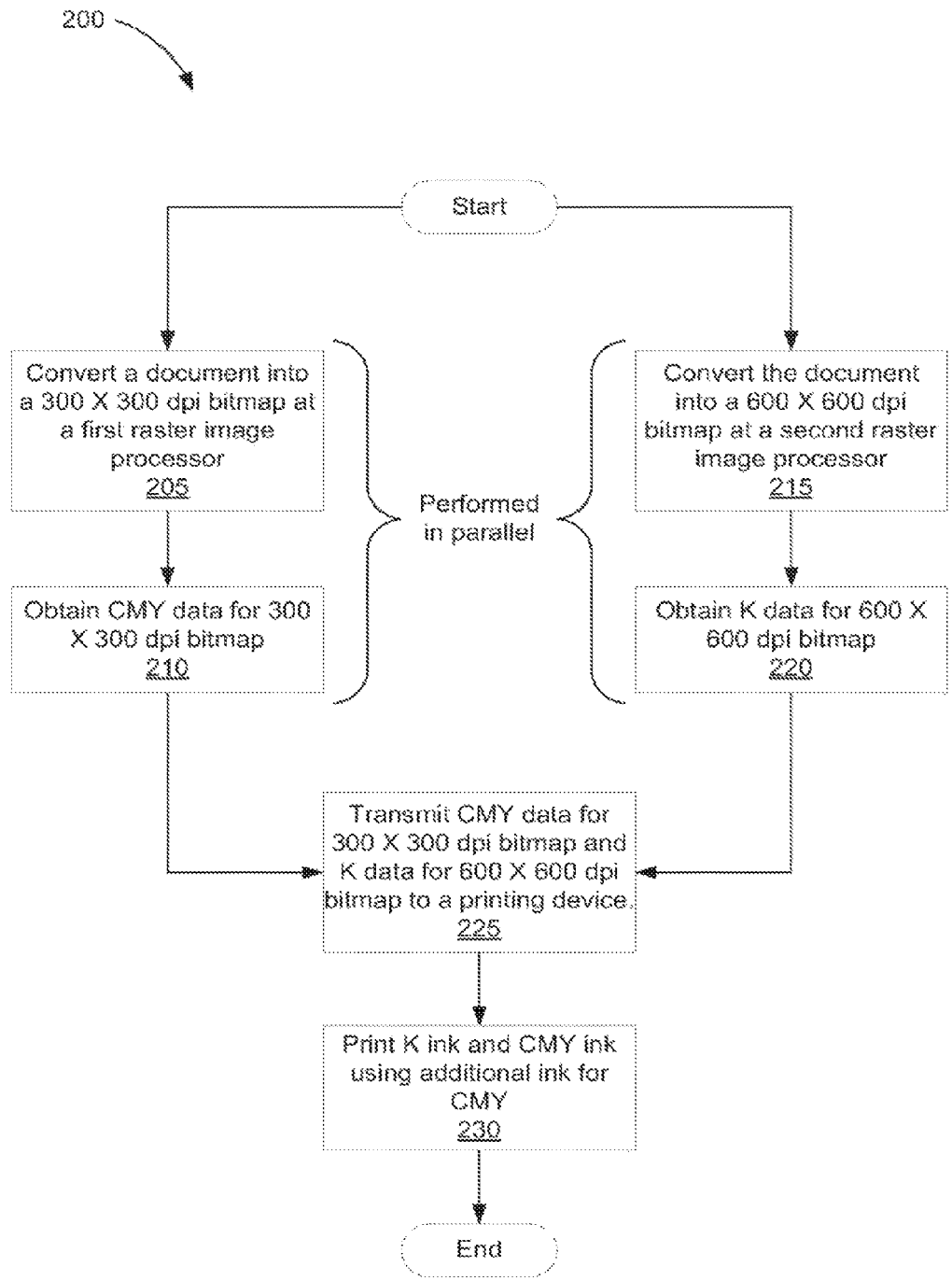
FIG. 2 is a flowchart showing an illustrative method for increasing data flow to a printing device using two raster image processors simultaneously, according to one example of the principles described herein.

FIG. 2 is a flowchart (200) showing an illustrative method for increasing data flow to a printing (195) device using two raster image processors (135, 185) simultaneously, according to one example of the principles described herein. The method may begin by converting (block 205) a document into a 300×300 dpi bitmap using the raster image processor (135) of the first computing device (105). The cyan, magenta, and yellow color planes are represented (block 210) by the 300×300 dpi bitmap. At block 215, the same document that was converted at block 205 is again converted (block 215) into a 600×600 dpi bitmap using the raster image processor (185) of the second computing device (155). The black color plane is represented (block 220) by the 600×600 dpi bitmap.

In one example, conversion (block 205) of the document into a 300×300 dpi bitmap using the raster image processor (135) of the first computing device (105) and conversion (block 215) of the document into a 600×600 dpi bitmap using the raster image processor (185) of the second computing device (155) are performed in parallel. Doing so allows for faster acquisition of bitmap data for the CMY and K data sets over performing these conversions in series. In this example, the first computing device (105) and second computing device (155) are communicatively coupled so that the timing of the simultaneous conversion of the document can be correctly coordinated between the first (105) and second (155) computing devices.

Further, in one example, obtaining (block 210) the cyan, magenta, and yellow color planes from the 300×300 dpi bitmap and obtaining (block 220) the black color plane from the 600×600 dpi bitmap are also performed in parallel in order to expedite the acquisition of the CMY and K data.

The method continues by transmitting (block 225) the CMY and K data of the respective bitmaps to the printing device (195) for printing (block 230). In one example, the CMY and K data may be temporarily stored or stockpiled in an intermediate data storage device such as, for example, data storage device (190) as will be discussed in more detail below. After the CMY and K data of the respective bitmaps are transmitted (block 225) to the printing device (195), the printing device (230) then prints (block 230) the black (K) ink and cyan, magenta, and yellow (CMY) inks. As described above, the printing device (195) deposits (block 230) additional ink per dot for the 300×300 dots per inch CMY bitmap data through its nozzles to compensate for the relatively lower dot density with respect to the black data's dot density when printing (block 230) the cyan, magenta, and yellow inks on the print medium.

In one example, the additional ink deposited is in the form of larger drops fired from a number of nozzles of the number of printheads. In this example, the droplet size of the ink ejected from the nozzles is increased to compensate for the 300×300 dots per inch bitmap from which the cyan, magenta, and yellow data is obtained (block 210). In this manner, the droplets cover more surface of the print medium, and can be enlarged to a droplet size such that the increase droplet size is comparable to, for example, the volume of ink used at the dot density of the black ink ejected from the nozzles (e.g. 600×600 dpi). Thus, although less data travels to the printing device (195) and an increase in data flow to the printing device (195) is achieved, the finished printed document will still have a clear and uniform color (CMY) deposition and look that is comparable to the black (K).

In another example, the additional ink deposited is in the form of more droplets fired from the nozzles of the printheads. In this example, if the 300×300 dots per inch CMY bitmap data is half the dot density relative to the black data, then the nozzles are instructed to deposit twice as many drops of ink onto the print medium. Thus, in this example, any number of additional dots of color (CMY) ink may be deposited on the print medium to compensate for the relatively lower dot density with respect to the black (K) ink dot density.

Figure 3:
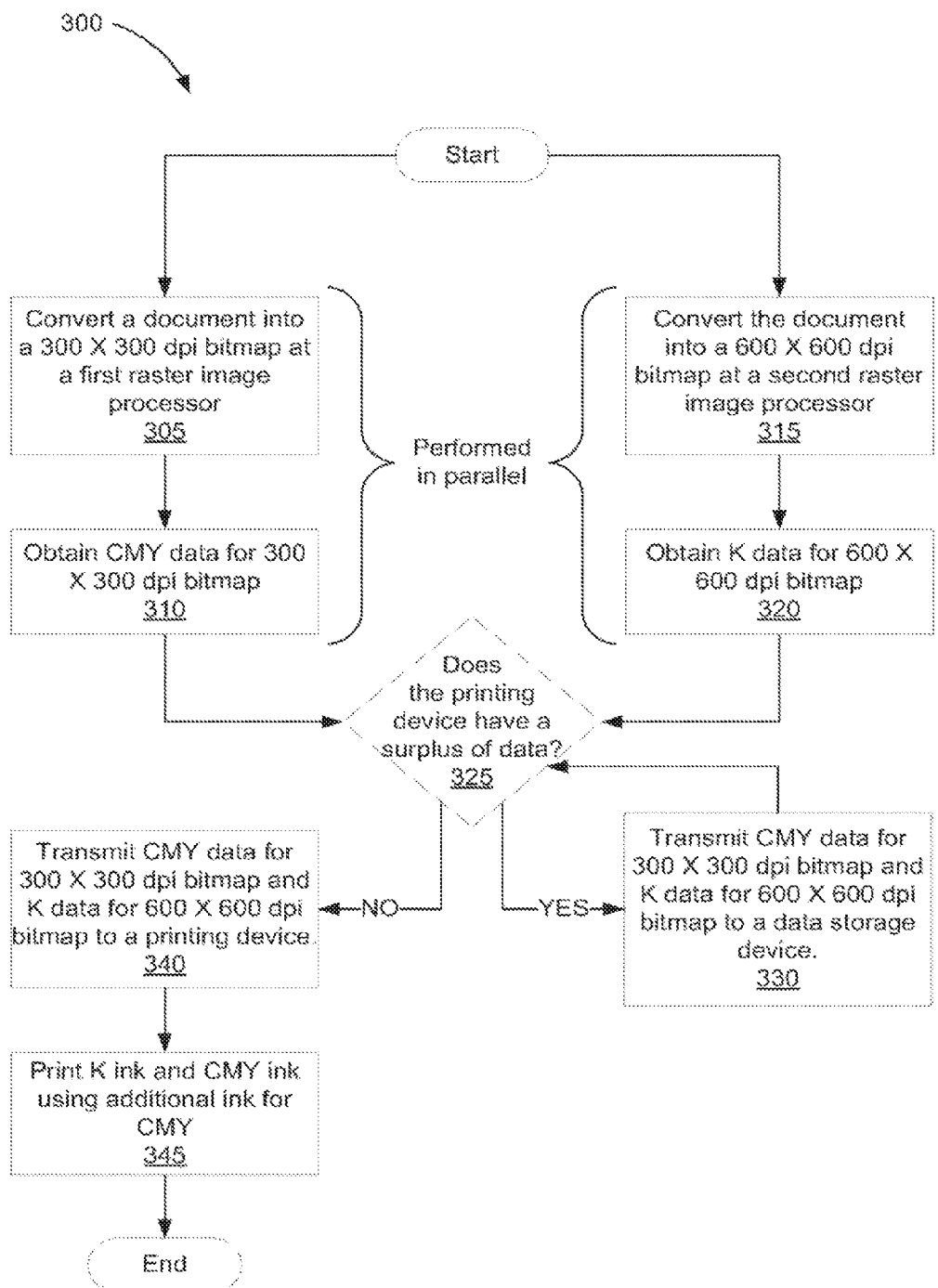
FIG. 3 is a flowchart showing an illustrative method for increasing data flow to a printing device using two raster image processors simultaneously, according to another example of the principles described herein.

FIG. 3 is a flowchart (300) showing an illustrative method for increasing data flow to a printing device using two raster image processors simultaneously, according to another example of the principles described herein. Blocks 305, 310, 315, and 320 perform in the same manner as described above in connection with blocks 205, 210, 215, and 220 of FIG. 2. At block 325 of FIG. 3, the system (100) determines whether the printing device (195) has a current surplus of data or if the printing device (195) needs more data. If the printing device (195) has a surplus of data (block 330, determination YES), then the CMY data and the K data is transmitted (block 330) and stored in the data storage device (190) for later use by the printing device (195). It is contemplated that, due to the decreased time in converting the document (blocks 305 and 315) and obtaining the CMY data (block 310) and K data (block 320) at blocks 305, 310, 315, and 320 of FIG. 3 and blocks 205, 210, 215, and 220 of FIG. 2, a surplus of data will be created. The data storage device (195) stores this surplus data for later consumption by the printing device (195). Block 330 then loops back to block 325, and it is again determined whether the printing device (195) has a current surplus of data (block 325).

Continuing on with FIG. 3, if, however, the printing device (195) does not have a surplus of data (block 325, determination NO), then the CMY data and the K data is transmitted (block 340) to the printing device for printing (block 345).

The methods described above may be accomplished in conjunction with a computer program product comprising a computer readable medium having computer usable program code embodied therewith that, when executed, performs the above methods. Specifically, the computer program product converts a document into a first bitmap defining a first dot density that represents the black color plane data. Then, the program product converts the document into a second bitmap representing the cyan, magenta and yellow color planes at a second dot density that is relatively lower than that of the first bitmap. The conversion of the document into the first bitmap is performed simultaneously with converting the document into the second bitmap. The above mentioned computer program then transmits the black data of the first bitmap and the cyan, magenta, and yellow data of the second bitmap to a printing device (195) for printing to a print medium.

The printing device (195) prints black ink onto the print medium at a dot density equal to the first dot density and prints cyan, magenta, and yellow inks onto the print medium at the second dot density. The lower dot density is printed with greater ink volume, either a larger ink volume per drop or multiple drops per dot, to balance the overall ink volume used to print the different color planes.

The specification and figures describe methods and systems for optimizing the data flow to a printing device (195). The methods and systems convert a document into a first bitmap at a first dot density with a first raster image processor (135), representing the black color plane in the first bitmap. Then the methods and systems also convert the document into a second bitmap with a second raster image processor (185) at a second dot density that is a relatively lower dot density than the first bitmap. Converting the document into the first bitmap may be performed simultaneously with converting the document into a second bitmap.

Although cyan (C), magenta(M), yellow (Y), and black (K) colors are referenced in the examples provided herein, any color plane scheme could be used with the principles described herein. In one example, color planes for cyan, magenta, yellow, light cyan, and light magenta are extracted from the document and represented in one of the two bitmaps at 300×300 dpi and a black color plane in the other bitmap at 600 dpi. In another example, cyan, magenta, yellow, orange, and green are the color planes represented in the first bitmap with black being represented in the second bitmap. In yet another example, cyan, magenta, yellow color planes are represented in the first bitmap and black and magnetic ink or toner (used in, for example, magnetic ink character recognition (MICR) technologies) are represented in the second bitmap.

Further, although relative dot densities between the first bitmap and the second bitmap are disclosed above at 300×300 dpi and 600×600 dpi, any dot densities may be used. Further, the dot densities of the first and second bitmaps may be converted at any fraction of dot density relative to the other. In one example, the dot density of the first bitmap is 600×600 dpi, and the dot density of the second bitmap is 1200×1200 dpi. In another example, the dot density of the first bitmap is 300×300 dpi, and the dot density of the second bitmap is 1200×1200 dpi.

The methods and systems for increasing data flow to a printing device may have a number of advantages, including: (1) ensuring that a printing device receiving data is not starved for want of data; (2) increasing the rate of converting a document into a bitmap; (3) increasing the rate at which printed materials are produced; and (4) ensuring that a printing process does not stop or slow down throughout a print job.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of managing data flow to a printing device comprising:
   with a first raster image processor, converting a document into a first bitmap having a first dot density;
   storing data representing a black color plane of the document;
   with a second raster image processor, converting the document into a second bitmap at a second dot density that is a relatively lower dot density than that of the first bitmap;
   storing data representing at least one other color plane of the document;
   printing the data representing the black color plane on a print medium; and
   printing the data representing the at least one other color plane on the print medium using a relatively higher volume of printable fluid than used in printing the data representing the black color plane.

2. The method of claim 1, wherein using the relatively higher volume of printable fluid than used in printing the data representing the black color plane comprises increasing the volume of jettable fluid deposited per dot for the at least one other color plane.

3. The method of claim 2, wherein increasing the volume of printable fluid deposited per dot comprises firing relatively larger droplets of printable fluid when printing said other color planes as compared to a size of droplets of printable fluid fired with printing said black color plane.

4. The method of claim 1, wherein increasing the volume of printable fluid deposited per dot comprises firing more drops per dot when printing said other color planes as compared to a number of drops fired when printing said black color plane.

5. The method of claim 1, wherein the first dot density is 600×600 dot per inch.

6. The method of claim 1, wherein the second dot density is 300×300 dot per inch.

7. The method of claim 1, wherein the document is one page of a postscript document.

8. The method of claim 1, wherein said other color planes comprise cyan, magenta, and yellow color planes.

9. The method of claim 1, comprising: determining whether the printing device has a surplus of data; in response to a determination that the printing device has a surplus of data, transmitting the first and second bit maps to a data storage device; and in response to a determination that the printing device does not have a surplus of data, transmitting the first and second bit maps to a printing device for printing to a print medium.

10. A system for increasing data flow to a printing device comprising:
    a first raster image processor to convert a document into a first bitmap at a first dot density representing a black color plane; and a second raster image processor to convert the document into a second bitmap at a second dot density representing at least one other color plane,
wherein the second dot density comprises a relatively lower dot density than the first bitmap, and
printing the data representing the black color plane on a print medium; and
printing the data representing the at least one other color plane on the print medium using a relatively higher volume of printable fluid than used in printing the data representing the black color plane,
wherein using the relatively higher volume of printable fluid than used in printing the data representing the black color plane comprises increasing the volume of jettable fluid deposited per dot for the at least one other color plane.

11. The system of claim 10, further comprising a data storage device to store the first and second bitmaps if the printing device has a surplus of data.

12. The system of claim 11, wherein the printing device deposits more printable fluid per dot when printing said other color planes than when printing said black color plane to compensate for the relative lower dot density of said other color planes.

13. The system of claim 12, wherein the printing device deposits relatively larger droplets of printable fluid when printing said other color planes as compared to printing said black color plane.

14. The system of claim 12, wherein the printing device deposits more drops of printable fluid per dot when printing said other color planes as compared to printing said black color plane.

15. The system of claim 12, wherein the other color planes comprise cyan, magenta and yellow color planes.

16. A computer program product for increasing data flow to a printing device, the computer program product comprising:
a computer readable storage device comprising computer usable program code embodied therewith, the computer usable program code to, when executed by a processor:
converts a document into a first bitmap at a first dot density representing a black color plane;
converts the document into a second bitmap at a second dot density that is a lower dot density than said first dot density, said second bitmap representing other color planes, wherein said first and second bit maps are produced in parallel;
determines whether the printing device has a surplus of data; in response to a determination that the printing device has a surplus of data, transmits the first and second bit maps to a data storage device;
in response to a determination that the printing device does not have a surplus of data, transmits the first and second bit maps to a printing device for printing to a print medium; and
increases a volume of printable fluid deposited per dot for said other colors planes as compared to a volume of printable fluid deposited per dot for said black color plane during printing of the first and second bitmaps to compensate for lower dot density.

17. The computer program product of claim 16, wherein cyan, magenta, and yellow color planes are represented in the first bitmap and black and magnetic printable fluid are represented in the second bitmap.

18. The computer program product of claim 16, wherein the document is a single page of a postscript document.

* * * * *